(12) United States Patent
Hettwer

(10) Patent No.: US 7,402,973 B2
(45) Date of Patent: Jul. 22, 2008

(54) POWER DRIVE UNIT WITH UNIT LOAD DEVICE SENSOR

(75) Inventor: Peter Nicholas Hettwer, Jamestown, ND (US)

(73) Assignee: Goodrich Corporation, Charlotte, NC (US)

(*) Notice: Subject to any disclaimer, the term of this patent is extended or adjusted under 35 U.S.C. 154(b) by 4 days.

(21) Appl. No.: 11/677,284

(22) Filed: Feb. 21, 2007

(65) Prior Publication Data

US 2007/0138343 A1    Jun. 21, 2007

Related U.S. Application Data

(63) Continuation of application No. 11/299,722, filed on Dec. 13, 2005, now Pat. No. 7,199,543.

(51) Int. Cl.
*B65G 43/04* (2006.01)
*B64C 1/22* (2006.01)

(52) U.S. Cl. ............ 318/563; 244/118.1; 244/137.1; 198/781.02

(58) Field of Classification Search ........... 318/480, 318/563, 640; 244/117 R, 118.1, 118.2, 244/137.1; 198/780, 781.01, 781.02, 781.08
See application file for complete search history.

(56) References Cited

U.S. PATENT DOCUMENTS

| | | | |
|---|---|---|---|
| 3,859,519 A | 1/1975 | Weischedel | |
| 4,121,709 A | 10/1978 | Bebhardt | |
| 4,880,304 A | 11/1989 | Jaeb et al. | |
| 4,970,384 A | 11/1990 | Kambe et al. | |
| 5,183,150 A | 2/1993 | Chary et al. | |
| 5,186,417 A | 2/1993 | Pritchard | |
| 5,213,201 A | 5/1993 | Huber et al. | |
| 5,267,709 A * | 12/1993 | Koharcheck et al. | 244/137.1 |
| 5,318,167 A | 6/1994 | Bronson et al. | |
| 5,568,858 A | 10/1996 | Thompson | |
| 5,661,384 A | 8/1997 | Glibbery | |
| 5,716,028 A | 2/1998 | Evans et al. | |
| 5,749,543 A | 5/1998 | Huber | |
| 6,135,269 A | 10/2000 | Huber et al. | |
| 6,328,154 B1 | 12/2001 | Huber | |
| 6,420,846 B1 | 7/2002 | Wolfe | |
| 6,433,329 B1 | 8/2002 | Butka et al. | |
| 6,791,100 B2 | 9/2004 | Dye | |
| 6,834,758 B2 | 12/2004 | Nguyen et al. | |
| 6,855,933 B2 | 2/2005 | Stone et al. | |
| 6,867,702 B2 | 3/2005 | Huber et al. | |
| 6,871,823 B2 | 3/2005 | Roberts | |
| 7,014,038 B2 | 3/2006 | Leingang et al. | |
| 2004/0144622 A1* | 7/2004 | Leingang et al. | 198/782 |

FOREIGN PATENT DOCUMENTS

DE    4136972    5/1993
GB    2294672    8/1998

* cited by examiner

*Primary Examiner*—Bentsu Ro
(74) *Attorney, Agent, or Firm*—Womble, Carlyle

(57) ABSTRACT

A cargo power drive unit includes a motor and at least one drive roller element coupled to the motor. The power drive unit further includes a light transmitter for emitting light and a light receiver for measuring light. The power drive unit measures an amount of ambient light and then measures an amount of total light after the light transmitter emits light. The power drive unit then determines whether a cargo container is present based on a calculation of reflected light and the measurement of ambient light.

10 Claims, 7 Drawing Sheets

POWER DRIVE UNIT WITH UNIT LOAD DEVICE SENSOR

RELATED APPLICATIONS

This is a Continuation of U.S. patent application Ser. No. 11/299,722 filed Dec. 13, 2005, now U.S. Pat. No. 7,199,543. The contents of the aforementioned parent application are incorporated by reference in their entirety.

FIELD OF THE INVENTION

One embodiment of the present invention is directed to a power drive unit for transporting cargo on an aircraft. More particularly, one embodiment of the present invention is directed to a sensor for a power drive unit for detecting unit load devices and scrubbing.

BACKGROUND INFORMATION

A large variety of motorized systems for moving cargo are known. Motor driven rollers are typically employed in these systems. Cargo and passenger airplanes in particular often employ a series of motor driven power drive units ("PDU"s) to quickly and efficiently propel cargo containers and pallets, otherwise known as unit load devices ("ULD"s), within the aircraft cargo compartment. This configuration can allow for the transportation of cargo from the external loader to the interior of the airplane by one or more operators controlling the PDUs.

Cargo within an airplane cargo deck is typically supported by a system of freely rotating floor-mounted conveyance rollers. Sets or banks of PDUs can be simultaneously elevated from beneath the cargo deck to a level just above the conveyance rollers. Each PDU may be a separate electromechanical actuator which includes one or more rubber coated wheels or drive rollers. The drive rollers of the elevated PDUs contact and move cargo above the conveyance rollers in the commanded direction upon energization. The movement of cargo depends on the coefficient of friction between the PDU drive rollers and the bottom surface of the cargo, as well as the lifting force generated by the PDU lift mechanism. When the PDUs are deenergized, roller rotation ceases and the cargo stops moving.

Several sets of PDUs can be arranged along a common path of conveyance, and each set can be operated separately, thereby allowing for the transfer of multiple pieces of cargo. An operator supervising the transportation of cargo into the cargo deck area can guide cargo by means of a joystick and an on/off switch or similar controls.

PDUs can be damaged when they continue to operate beneath immobilized cargo, a condition known as scrubbing, which can occur when cargo is too heavy or has come upon an obstruction such as a wall guide within the cargo compartment. Scrubbing can quickly wear away the rubber coating on the rollers necessitating their replacement and can result in damage to the PDU motor.

Cargo container stall sensors integrated within a PDU are used to sense a stalled container and to remove power to the PDU motor after a predetermined delay to avoid PDU damage. Some PDU control systems have a manual de-select switch for removing power to the PDUs when a stall condition is determined. Unfortunately, this de-select switch is often not used properly by operators, who are focused on loading cargo rather than protecting PDUs. Thus, damage to PDUs when scrubbing conditions occur is a common problem.

Known stall sensors include mechanisms for monitoring the temperature of the PDU motor, which is subject to measurement error, or require additional electro-mechanical mechanisms on the PDU, which are susceptible to wear and other maintenance issues.

Further, in the aircraft cargo area, it is important to keep track of the location of the ULDs. The most common method of keeping track of these ULDs, while they are in the cargo area, is by detecting them as they pass over a ULD sensor which is located on the floor of the cargo compartment. One known sensing method is the use of infrared light to determine the presence of the ULD. This known ULD detector employs a digital sensor which only allows two states (i.e., "ULD present" or "ULD not present"). Further, the circuitry used in the known detector to create and detect the infrared light requires heavy filtering because of ambient infrared light, which can vary greatly. In addition, the known ULD sensor applies power to the infrared light source constantly, which means that the amount of electrical current applied must be kept low so that the light source does not overheat.

Based on the foregoing, there is a need for an improved PDU that includes an integrated ULD detector and a non-mechanical scrubbing sensor.

SUMMARY OF THE INVENTION

One embodiment of the present invention is a cargo power drive unit that includes a motor and at least one drive roller element coupled to the motor. The power drive unit further includes a light transmitter for emitting light and a light receiver for measuring light. The power drive unit measures an amount of ambient light and then measures an amount of total light after the light transmitter emits light. The power drive unit then determines whether a cargo container is present based on a calculation of reflected light, the measurement of total light, and the measurement of ambient light.

DETAILED DESCRIPTION

One embodiment of the present invention is a PDU with an integrated sensor for detecting the presence of a ULD and for sensing scrubbing.

Figure 1:
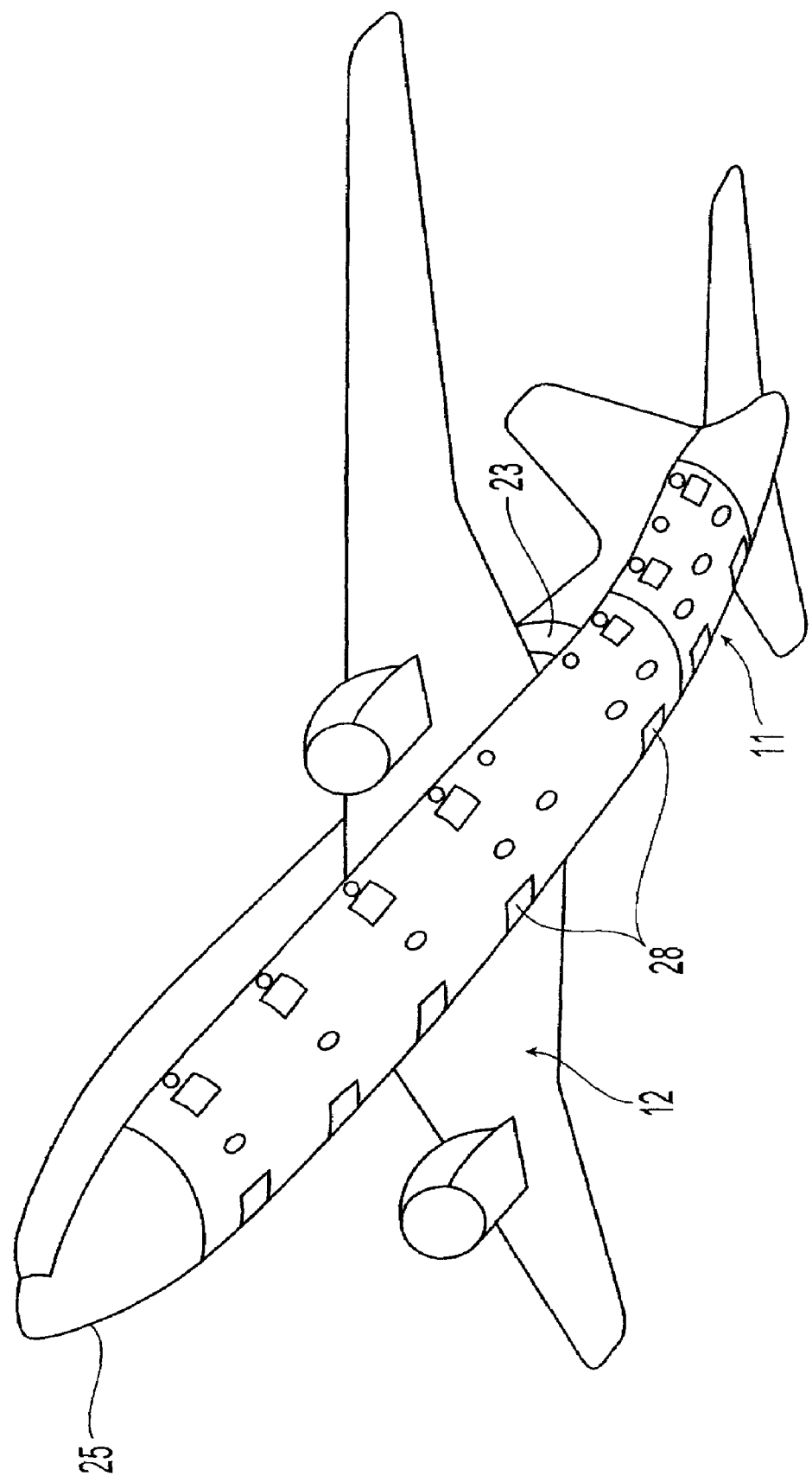
FIG. 1 illustrates an aircraft and FIG. 2 an aircraft cargo deck that can be used to implement an embodiment of the present invention.
Figure 2:
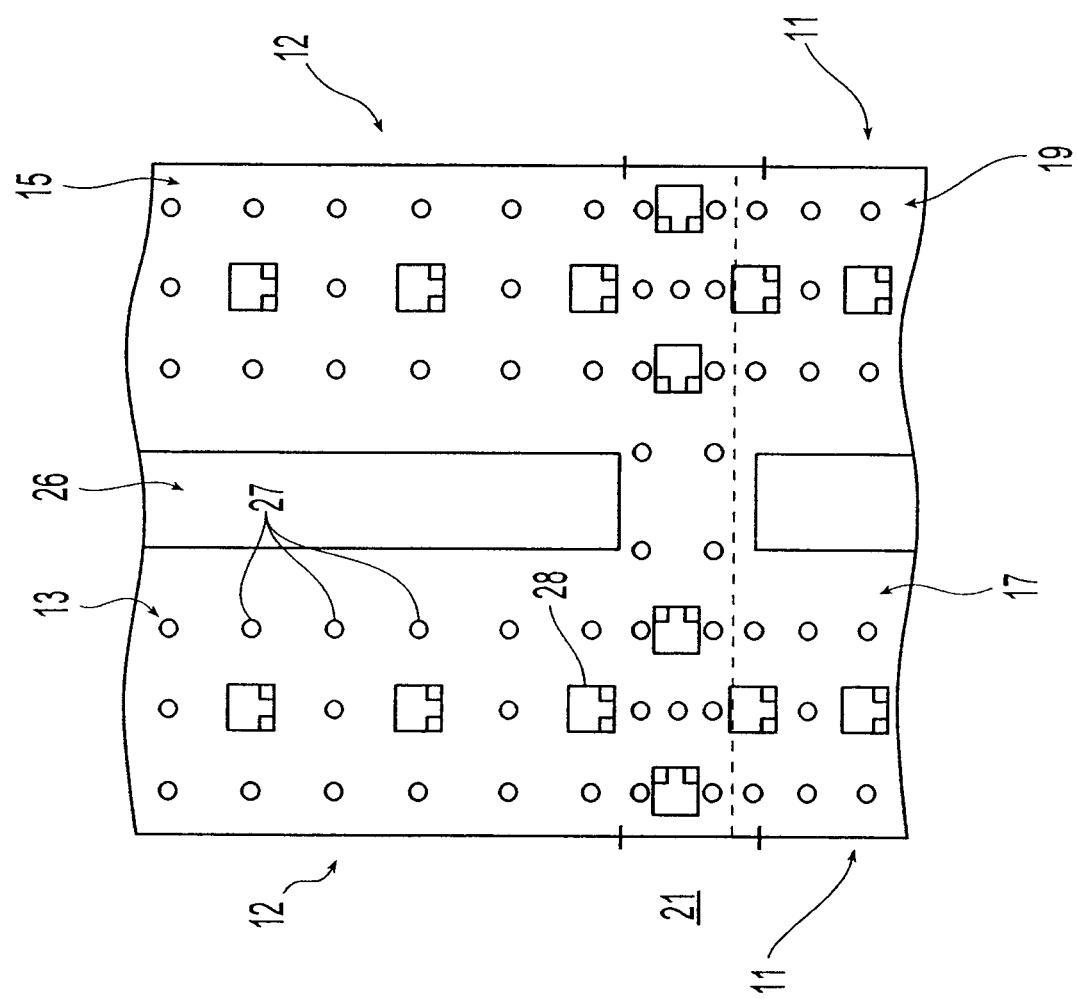

FIG. 1 illustrates an aircraft 25 and FIG. 2 an aircraft cargo deck 26 that can be used to implement an embodiment of the present invention. A generally H-shaped conveyance surface 26 forms a deck of an aircraft, adjacent a cargo bay loading door 23. However, there are many other aircraft cargo deck configurations to which the embodiments of the invention can be implemented. For example, some aircraft, particularly those configured primarily for the transportation of cargo without passengers, have the upper passenger deck removed and an additional larger cargo deck installed. Other aircraft may have three or more parallel longitudinal tracks rather than the H-shape shown in FIG. 2.

The cargo surface includes a system of freely rotating conveyance rollers 27 mounted in the cargo deck to define the conveyance plane. Cargo loaded onto the aircraft cargo deck can be moved manually throughout the cargo bay upon the freely rotating conveyance rollers. However, it is desirable to electro-mechanically propel the loads with minimal or no manual assistance. To this end, the H-shaped cargo surface includes a number of PDUs 28, that provide a mechanism upon which cargo is propelled over the conveyance rollers 27. Each PDU 28 typically includes a drive roller element which can be raised from a lowered position beneath the cargo deck to an elevated position. These PDUs are referred to as "self-lift" PDUs. In the elevated position, the drive roller element contacts and drives the overlying cargo that rides on the conveyance rollers. Other types of PDUs, which can also be used as embodiments of the present invention, are above the conveyor plane all of the time and held up by a spring. These PDUs are referred to as "spring-lift" PDUs.

In the longitudinal direction, the H-shaped conveyance surface 26 includes a left track and a right track along which cargo is to be stowed in parallel columns during flight. In the transverse direction, the cargo deck is also separated into a tail (or "aft") section 11 and a forward section 12. Thus, the left and right tracks are divided into four sections, two forward sections 13 and 15 and two aft sections 17 and 19. In addition to the four sections, there is an additional path 21 between both tracks at the cargo door 23. This additional path 21 divides the cargo bay between the forward and aft sections 11 and 12. This path is used to move cargo into and out of the aircraft, and also to transfer cargo between the left and right storage tracks.

In one embodiment, a human operator manipulates control elements to selectively and electrically energize PDUs 28 in each of the five aforementioned sections 13, 15, 17, 19 and 21. Typically, these controls are mounted in an operator interface unit. The control elements may be mounted on a wall or other structure within the cargo bay or may be portable, e.g., the controls may be in a hand held pendant. These controls typically have an on/off switch and a joystick which, depending on the direction pushed, will energize a set of PDUs 28, causing groups of drive roller elements to be elevated (if not already elevated) and rotated in one of two possible directions (i.e., forward or reverse). A section of PDUs will remain energized as long as the joystick is held in a corresponding position. When the joystick is released, the set of PDUs selected is de-energized and the drive roller elements are returned to their retracted position below the plane of the conveyance rollers 27, or the PDUs remain up, and brakes are applied to hold the cargo containers in place. Control systems of this type are known in the art.

Figure 3:
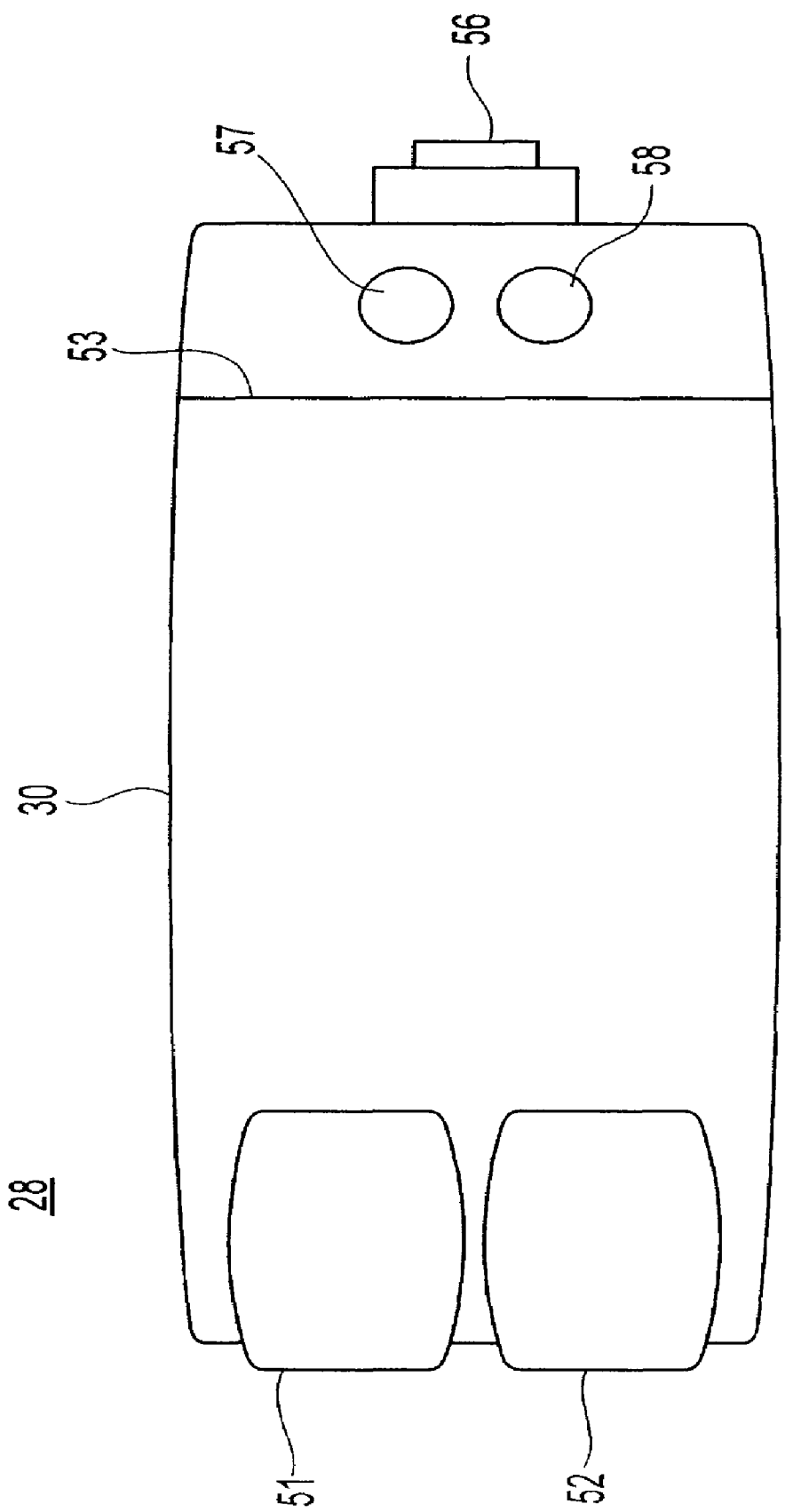
FIG. 3 is a top view of a PDU in accordance with one embodiment of the present invention.

FIG. 3 is a top view of a PDU 28 in accordance with one embodiment of the present invention. PDU 28 includes a housing 30 which incorporates a pair of wheels 51 and 52 that function as drive roller elements. Wheels 51 and 52 are coupled to a drive shaft (not shown). PDU 28 further includes necessary motor and gear assemblies (not shown) for turning and/or raising wheels 51 and 52 so that wheels 51 and 52 are positioned above the cargo deck and are able to contact the bottom of a ULD. PDU 28 further includes an electronics cavity that is separated from the rest of the PDU by a wall 53 for housing the necessary electronics (disclosed in more detail below), and includes an electrical connector 56 for coupling the electronics to a power and a control source. PDU 28 further includes an infrared light ("IR") transmitter 57, such as a light emitting diode ("LED"), for transmitting infrared light, and an IR receiver 58, such as a photo transistor, for detecting the presence of infrared light. In other embodiments, other types of light besides IR can be used.

Figure 4:
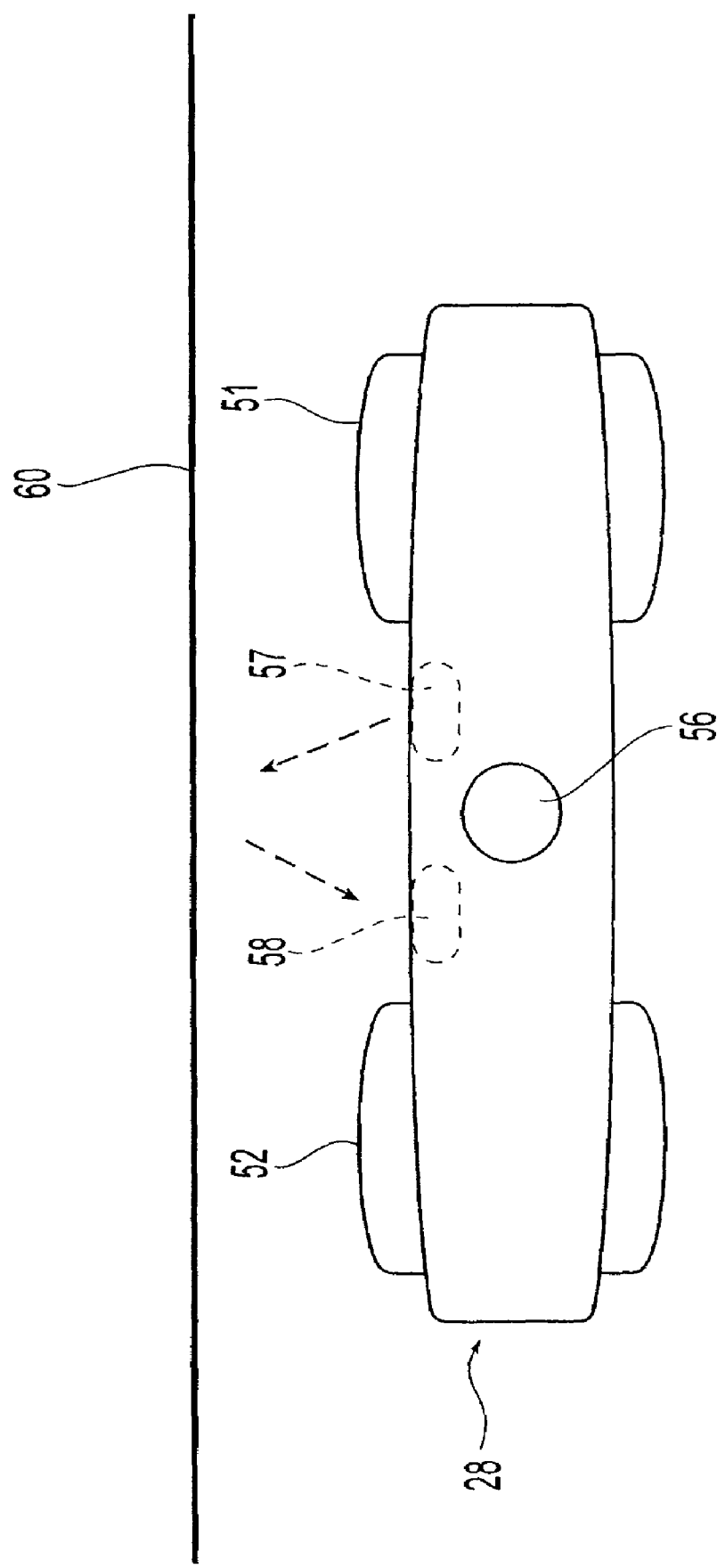
FIG. 4 is an end view of the PDU in accordance with one embodiment of the present invention.

FIG. 4 is an end view of PDU 28 in accordance with one embodiment of the present invention, and illustrates the relationship of PDU 28 with the bottom surface 60 of a ULD that is passing over and being propelled by PDU 28. IR transmitter 57 transmits light that bounces off the bottom surface 60 (assuming a ULD is present) and is reflected back to IR receiver 58 where it is processed by the electronics of PDU 28.

Figure 5:
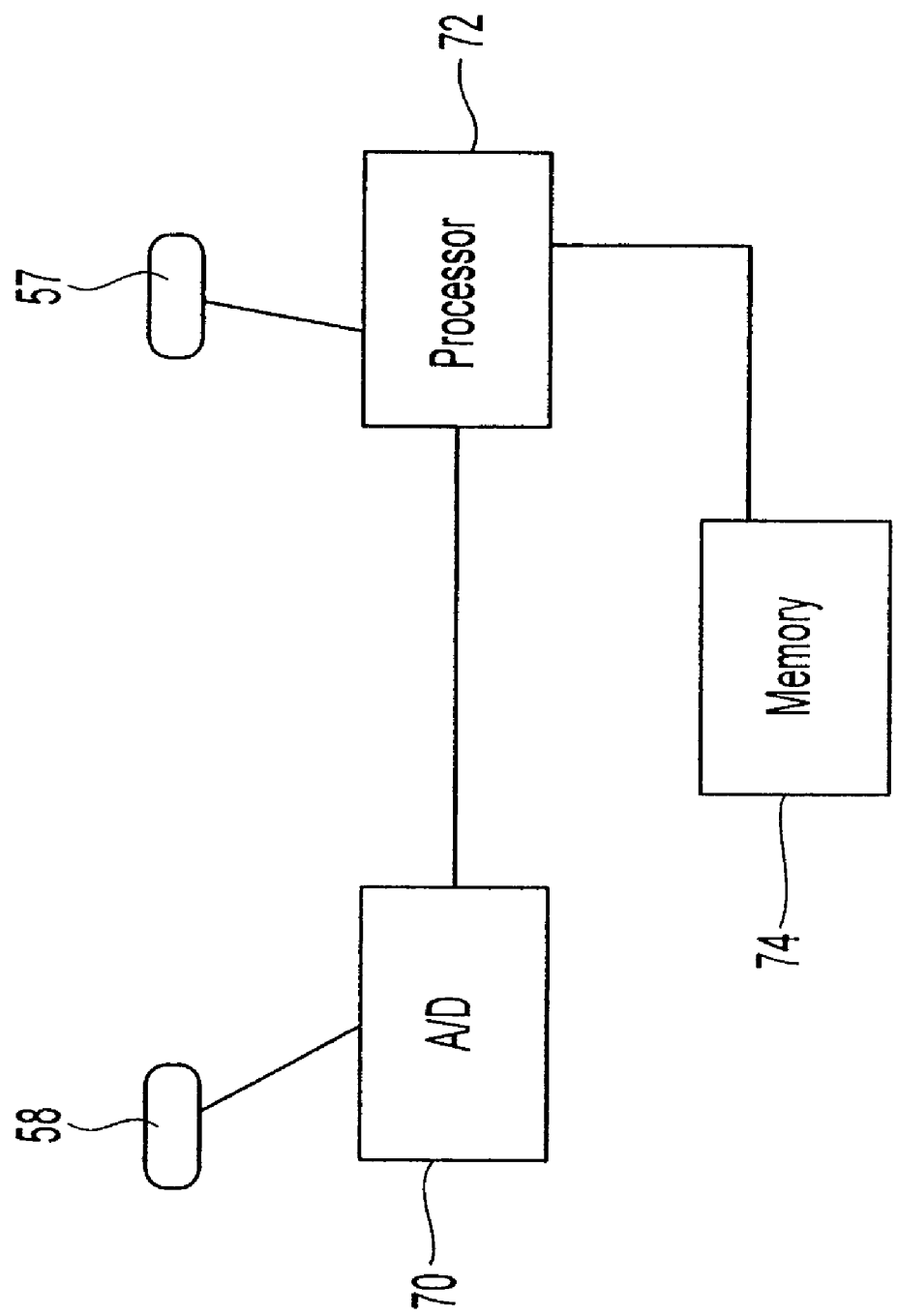
FIG. 5 is a block diagram of the electronics of the PDU in accordance with one embodiment of the present invention.

FIG. 5 is a block diagram of the ULD sensor and scrub sensor electronics of PDU 28 in accordance with one embodiment of the present invention. Coupled to IR receiver 58 is an analog to digital ("A/D") converter 70 that takes an analog input from receiver 58 and converts it to a digital value. Coupled to A/D converter 70 is a processor 72 and memory 74. Processor 72 may be any type of general purpose processor, and memory 74 may be any type of storage device that stores instructions to be executed by processor 72. In one embodiment, processor 72 may include A/D converter 70 and/or memory 74. IR transmitter 57 is coupled to an output pin of processor 72. In one embodiment, a power driver is needed between processor 72 and IR transmitter 57.

In an additional embodiment, a processor adjustable variable resistor is coupled to processor 72 and receiver 58. The variable resistor is used to set the sensitivity of AND converter 70, which selects the window of light that the sensor will measure (i.e., the minimum strength of light that will be detected and the greatest strength of light that can be measured before the A/D output reaches its maximum value).

Figure 6:
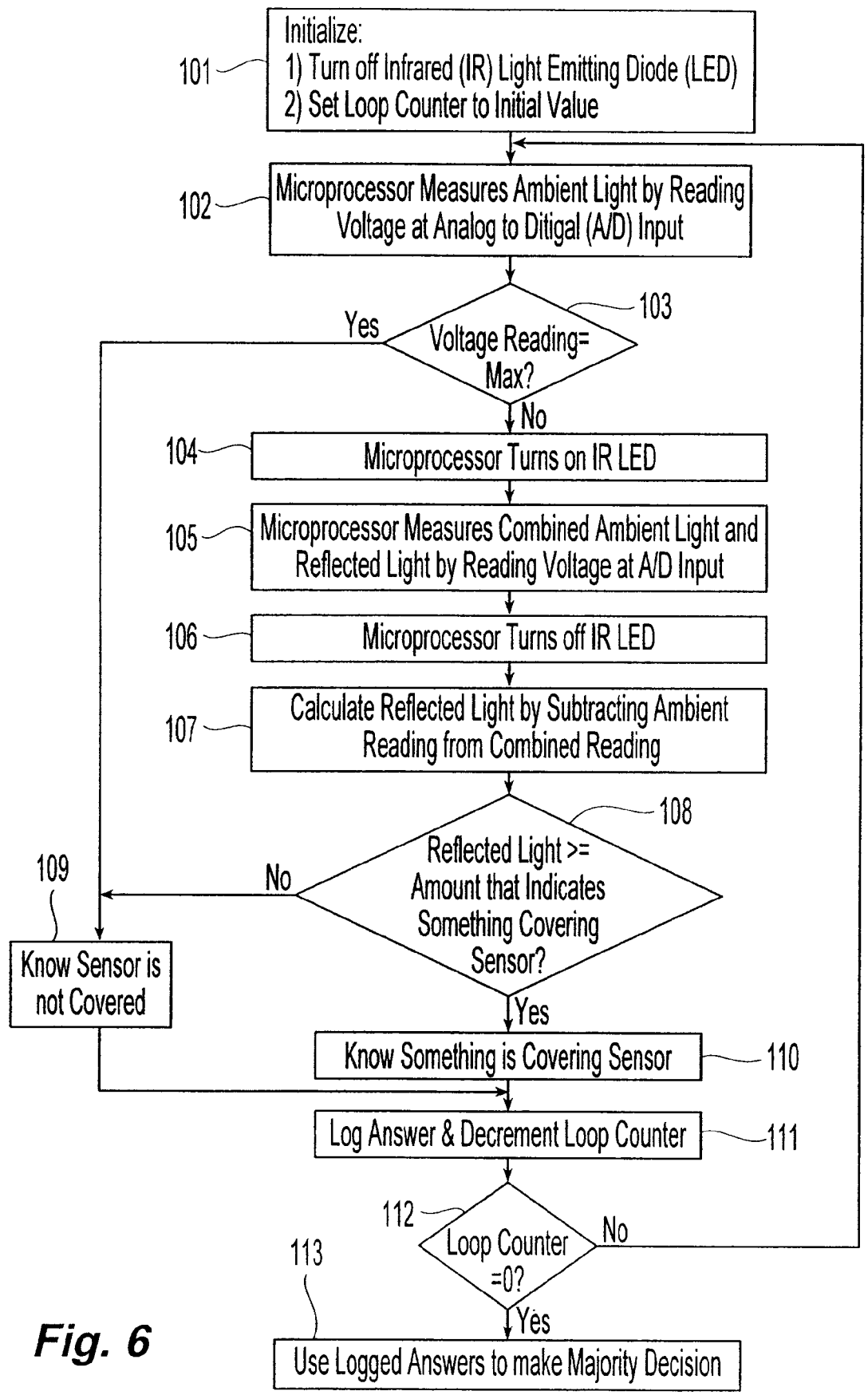
FIG. 6 is a flow diagram of the functionality performed by the PDU in order to sense the presence of a ULD in accordance with one embodiment of the present invention.

FIG. 6 is a flow diagram of the functionality performed by PDU 28 in order to sense the presence of a ULD in accordance with one embodiment of the present invention. In one embodiment, the functionality is implemented by software stored in memory 74 and executed by processor 72. In other embodiments, the functionality can be performed by hardware, or any combination of hardware and software.

101: The process is initialized by turning off IR transmitter 57 and setting a loop counter to an initial value.

102: The ambient light is measured by reading the voltage level from AND converter 70.

103: If the voltage reading equals a predetermined maximum reading, then the ULD sensor is not covered (i.e., a ULD is not present over PDU 28) and the flow moves to 109 and then 111.

104: IR transmitter 57 is turned on.

105: The combined ambient light and reflected light is read from A/D converter 70.

106: IR transmitter 57 is turned off.

107: The reflected light is calculated by subtracting the ambient reading at 102 from the combined reading at 105.

108: A determination is made as to whether the reflected light calculated at 107 is greater than or equal to a predetermined amount that indicates that an object (most likely a ULD) is covering the sensor. If not, then the flow moves to 109 and then 111. If yes, then an object (e.g., a ULD) is covering the sensor at 110.

In one embodiment, the sensor is covered by a ULD if, because of a ULD passing over the sensor, less ambient light gets to the sensor. The sensor may be considered covered if the ULD is positioned overhead the sensor, or between the ambient light and the sensor from any other position.

111: The answer from 109 or 110 (i.e., the sensor is or is not covered) is logged or stored and the loop counter is decremented.

112: A determination is made as to whether the loop counter equals 0. If not, the flow returns to 102. If yes, at 113 a decision is made as to whether a ULD is present based on the majority of the logged decisions or some other algorithm.

As disclosed above, with the ULD sensor in accordance with an embodiment of the present invention, the output of the IR receiver 58 is fed directly into an A/D converter of a microprocessor instead of conditioning the signal to give only two states as in the prior art. Therefore, the reflected light can be measured as not just two levels, but many levels (e.g., 256, 1024, 4096, etc). A differential A/D converter can be used to offer increased accuracy by reducing the effects of ambient electrical noise. In addition, because the processor in the present invention takes an ambient light reading before it turns on its IR light source, the processor can subtract out the ambient light value. The present invention thus has a better sensitivity/resolution and an improved accuracy over the prior art. Because of the power/speed of the processor of the present invention, the light level may be read many times per second which also allows the processor to recognize the on/off pattern of the light from the IR LED. Further, the ULD sensor in accordance with an embodiment of the present invention turns the LED on and off which gives it a chance to cool when it is off. This allows the LED to be driven with higher current levels when it is on, thereby allowing it to emit much higher levels of light. This allows a single LED to be used in embodiments of the present invention in place of the multiple LEDs that are required to be used in prior art designs.

Figure 7:
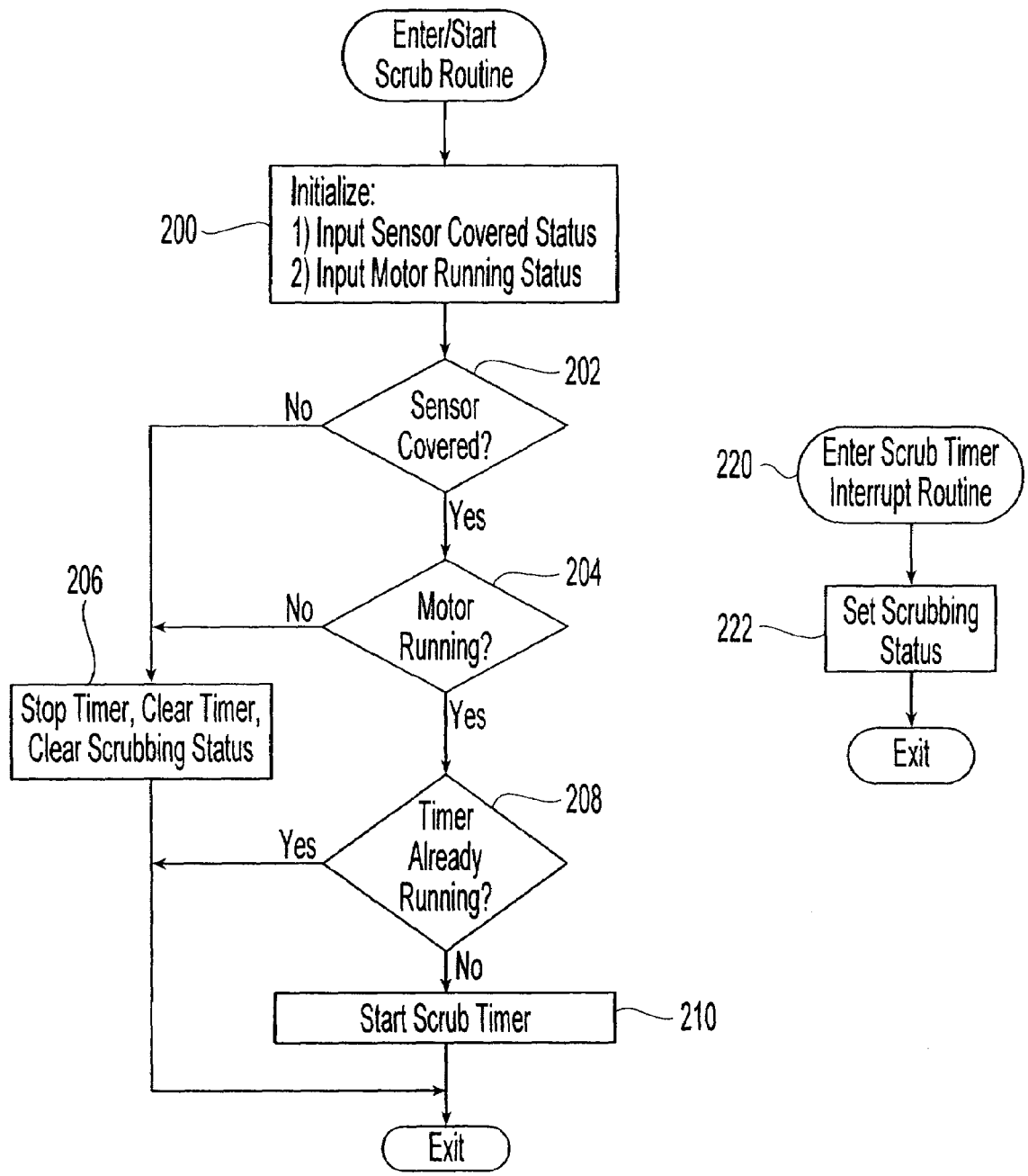
FIG. 7 is a flow diagram of the functionality performed by the PDU in order to sense ULD scrubbing in accordance with one embodiment of the present invention.

FIG. 7 is a flow diagram of the functionality performed by PDU 28 in order to sense ULD scrubbing in accordance with one embodiment of the present invention. In one embodiment, the functionality is implemented by software stored in memory 74 and executed by processor 72. In other embodiments, the functionality can be performed by hardware, or any combination of hardware and software.

200: The process is initialized by receiving as input whether the sensor is covered by a ULD (from the output of the flow illustrated in FIG. 6), and whether the PDU motor is running (from other software in memory 74 that controls the PDU motor).

202: If the sensor is not covered, no scrubbing can be occurring at 206 so a software timer (if running) is stopped and cleared, and the scrubbing status is cleared.

204: The sensor is covered so it is determined if the PDU motor is running (i.e., the PDU wheels are being powered). If not, no scrubbing can be occurring and flow goes to 206.

208: If the scrub timer is not already running, the scrub timer is started at 210. The scrub timer trips a software interrupt when it reaches a predetermined value. The value is based on tracking how long the PDU is running versus how long the ULD has been present over the PDU. The value put into the timer is calculated based on the container size and the speed the PDUs move the ULDs. If the timer runs out before the PDU is shutoff (i.e. "running" becomes false) or the PDU no longer has a container above it (i.e. "covered" becomes false) then the PDU tires are determined to be slipping/scrubbing. This PDU covered time versus PDU run time provides the necessary data for the PDU to function as a scrub sensor. For example, if a 50 inch container covers the ULD sensor for longer than it should (with allowances) when the PDU under the container is trying to move the container, then the container/ULD is probably stuck/scrubbing and the PDU motor should be shut off in order to avoid PDU tire wear and PDU motor overheating.

As an example of the timer value calculation in accordance to one embodiment of the invention: Assume the tires of a PDU turn at a speed which moves ULDs at 60 feet per minute or 1 foot per second. For a 5 foot long container, it would take 5 seconds to move the container across the PDU. The timer is loaded with 7 seconds, which equals the exact 5 seconds required plus 2 extra seconds to allow for an acceptable level of slippage. When a PDU is commanded to drive, it turns on its motor (so "running" is true at 204). When a ULD is moved onto the PDU, the ULD sensor is used to determine that the PDU is covered (so "covered" is true at 202). When both "running" and "covered" are true, the timer is started. If the timer alarm reaches its trigger value before the PDU is uncovered or the PDU motor is commanded to stop, then the container is determined to be stuck (i.e., it took too long for the PDU to move the container across itself and the "assumed" reason is that the PDU tires are slipping/scrubbing). The timer is stopped and loaded with 7 seconds each time either "running" or "covered" are false and the timer is not started again until both "running" and "covered" are true.

Embodiments of the present invention "assume" that the PDU tires are slipping/scrubbing when it takes "too long" for the ULD to cross the PDU (i.e., it takes longer than a calculated time for a ULD of a given length traveling at a given speed to move across the PDU). This is a valid assumption since it is true for an extremely high percentage of cases. Alternative reasons would include that the PDU has a mechanical problem—in which case shutting down the PDU because of the scrub "assumption" does no harm and may actually mitigate PDU damage.

220: In one embodiment of the present invention, the timer interrupt feature built into many of today's processors is utilized. In this embodiment, the expiration of the scrub timer causes entry into an interrupt routine. In other embodiments, a non-interrupt software timer can be utilized, or a hardware timer, or combination of the two.

222: The scrubbing status is set, and action can be taken based on the status (e.g., automatically shut off the PDU motor because of the scrubbing). This action can occur in the interrupt routine and/or in other routines in the memory 74.

The internal PDU motor automatic scrub timeout shutdown can be reset each time the PDU processor receives a PDU motor off command from the system controller (e.g., when the cargo system human operator releases the joystick). This allows the cargo system human operator to once again drive the PDU motor under a scrubbing container in an attempt to free/move the container.

As disclosed, the PDU in accordance with the present invention uses an IR transmitter and receiver to detect the presence of a ULD over a PDU, and to detect scrubbing, without requiring the use of extra hardware such as an additional wheel.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of detecting scrubbing of a drive roller element by a cargo power drive unit to which the drive roller element belongs, comprising:

calculating a length of time a cargo container is present above a cargo power drive unit;

determining if a motor of the cargo power drive unit is running; and determining if the drive roller element is scrubbing based on said calculated length of time and said determination of whether the motor is running.

2. The method of claim 1, wherein said calculating the length of time the cargo container is present, is based at least in part on light reflected from an underside of said cargo container.

3. The method of claim 1, wherein said calculating the length of time the cargo container is present comprises:
   measuring an ambient light at a light receiver;
   emitting light at a light transmitter;
   measuring a combined reflected light and ambient light at the light receiver;
   calculating a reflected light; and
   determining the presence of a cargo container based on said calculation of reflected light.

4. The method of claim 3, wherein said calculating the reflected light comprises:
   measuring a combined reflected and ambient light when emitting light at the light transmitter; and
   calculating an amount of reflected light that is returned from said cargo container by subtracting the ambient light measurement from the combined light measurement.

5. The method of claim 1, further comprising:
   removing power from the drive roller element of the cargo power drive unit if it is determined that the drive roller element is scrubbing.

6. A computer readable medium having instructions stored thereon that, when executed by a processor, cause the processor to:
   calculate a length of time a cargo container is present at a cargo power drive unit;
   determine if a motor of the cargo power drive unit is running; and
   determine if at least one drive roller element of the cargo power drive unit is scrubbing based on said calculated length of time and said determination of whether the motor is running.

7. The computer readable medium of claim 6, said instructions causing said processor to calculate the length of time the cargo container is present based at least in part on light reflected from an underside of said cargo container.

8. The computer readable medium of claim 7, said instructions further causing said processor to:
   remove power from the drive roller element of the cargo power drive unit if it is determined that said drive roller element is scrubbing.

9. The computer readable medium of claim 6, said instructions causing said processor to calculate the length of time the cargo container is present by:
   measuring an ambient light at a light receiver;
   emitting light at a light transmitter;
   measuring a combined reflected light and ambient light at the light receiver;
   calculating a reflected light; and
   determining the presence of a cargo container based on the calculation of reflected light.

10. The computer readable medium of claim 9, said instructions causing said processor to calculate the reflected light by:
   measuring a total light when transmitting light at the light transmitter; and
   calculating an amount of reflected light that is returned from said cargo container by subtracting the ambient light from the combined reflected and ambient light.

* * * * *